(12) United States Patent
Sauermann et al.

(10) Patent No.: US 7,373,340 B2
(45) Date of Patent: May 13, 2008

(54) COMPUTER IMPLEMENTED METHOD AND ACCORDING COMPUTER PROGRAM PRODUCT FOR STORING DATA SETS IN AND RETRIEVING DATA SETS FROM A DATA STORAGE SYSTEM

(75) Inventors: Volker Sauermann, Heidelberg (DE); Arne Schwarz, Walldorf (DE); Axel Von Bergen, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 482 days.

(21) Appl. No.: 10/927,631

(22) Filed: Aug. 27, 2004

(65) Prior Publication Data

US 2005/0060302 A1  Mar. 17, 2005

(30) Foreign Application Priority Data

Aug. 27, 2003 (EP) ................... 03019332

(51) Int. Cl.
*G06F 17/30* (2006.01)
(52) U.S. Cl. ............................... 707/3; 707/1
(58) Field of Classification Search .................... 707/1, 707/3, 100
See application file for complete search history.

(56) References Cited

U.S. PATENT DOCUMENTS

| 5,852,821 A | 12/1998 | Chen et al. | |
|---|---|---|---|
| 6,865,567 B1 * | 3/2005 | Oommen et al. | 707/2 |
| 2004/0139067 A1 * | 7/2004 | Houle | 707/3 |

FOREIGN PATENT DOCUMENTS

| JP | 2001-117800 A | * 10/1999 |
|---|---|---|
| WO | WO 02/061612 A | 8/2002 |
| WO | WO 02/061613 A2 | 8/2002 |

OTHER PUBLICATIONS

Ming-Chuan Wu et al., "Encoded bitmap indexing for data warehouses", book, Feb. 23, 1998, Data Engineering, United States.

(Continued)

*Primary Examiner*—Sam Rimell
*Assistant Examiner*—Mellissa M Chojnacki
(74) *Attorney, Agent, or Firm*—Browdy and Neimark

(57) ABSTRACT

A computer implemented method for storing data sets in and retrieving data sets from a data storage system in a given number and sorted by a data attribute of the data set comprises storing data sets each including one or more attributes in a plurality of binary tree structures (1), each of said binary tree structures (1) with their nodes (2) representing the entity of one of the data attributes of the data sets in a sorted manner, receiving a query for searching and returning data sets according to query conditions in said given number and sorted by a sort attribute, accessing the binary tree structure (1) of said sort attribute, serially traversing the nodes (2) of said binary tree structure (1) according to the sort attribute, at each node (2) checking whether the data set associated to said node meets the query conditions and, if true, returning said data set, terminating said traversing when said given number of data sets is reached.

14 Claims, 5 Drawing Sheets

OTHER PUBLICATIONS

Theo Harder, Erhard Rahm, Datenbanksysteme, Konzepte und Techniken der Implementierung, abstract, 1999, Springer, Heidelberg.

Chen C. M. et al "The Implementation and Performance Evaluation of the ADMS Query Optimizer: Integrating Query Reslt Caching and Matching" Lecture Notes in Computer Science. vol. 779 (Mar. 1994) pp. 323-336.

Derthick M et al, "Efficient multi-object dynamic query histograms" Proceedings, 1999, IEEE Symposium on Information Visualization (Oct. 1999) pp. 84-91.

Haas P et al, "Sequential sampling procedures for query size estimation" Proceedings of the 1992 ACM Sigmod International Conference on Management of Data (1992) pp. 341-350.

Jae-Heon Cheong et al "A Boolean query processing with a result cache in mediator systems" Advances in Digital Libraries. (May 2000) pp. 218-227.

O'Neil P et al "Improved Query Performance with Variant Indexes" Sigmod Record. vol. 26, No. 2 (Jun. 1997) pp. 38-49.

Yi-Leh Wu et al, "Query estimation by adaptive sampling" Proceedings 18th International Conference on Data Engineering (ICDE 2002) vol. Conf. 18 (Feb. 2002) pp. 639-648.

* cited by examiner

COMPUTER IMPLEMENTED METHOD AND ACCORDING COMPUTER PROGRAM PRODUCT FOR STORING DATA SETS IN AND RETRIEVING DATA SETS FROM A DATA STORAGE SYSTEM

FIELD OF THE INVENTION

The invention refers to a computer implemented method for storing data sets in and retrieving data sets from a data storage system in a given number and sorted by a data attribute. The invention further relates to an according computer program product.

BACKGROUND OF THE INVENTION

The present invention is relevant for the field of data bases, especially data base systems handling huge numbers of data. In this connection the patent applications WO 02/061612 A2 and WO 02/061613 A2 disclose—amongst others—such data base systems, data structures used therein and query optimizers for such data base systems. The disclosure of both these applications is incorporated herein by reference. These applications especially reflect storage and query strategies based on balanced binary trees.

Furtheron reference is made to European patent application No. 03 015 365.4 (prior art according to article 54(3) EPC), which basically discloses the method of storing certain query results as bitmaps, which is a very simple and machine-oriented strategy of storing data. Again the contents of this older patent application is incorporated herein by reference.

Now concerning the background of the present invention reference is made to the practical use of data storage systems. Users of such systems enter queries comprising query conditions into the data storage system to get back according result data sets, e.g. including a certain name or date. Especially in case of huge numbers of hits and thus data sets to be returned users commonly want to have a certain sorting so that only a restricted number of hits are presented to them, e.g. the ten youngest persons with the query condition "NAME=Smith".

Known sorting methods go through the whole result data sets to filter out the required hits according to the given sort attribute, i.e. such sorting can be very time-consuming for such data sets. Generally spoken, if one wants to return only the first ten data sets of a result set of M hits sorted by a particular sort attribute the data storage system must in any case sort the entire result set.

SUMMARY OF THE INVENTION

Accordingly it is an object of the invention to provide a method for storing data sets in and retrieving data sets from a data storage system and further an according computer program product, which effectively reduces the processing time of a query to be handled by the data storage system in case a restricted number of data sets are to be returned in a sorted manner according to a given sort attribute.

This object is met by a computer implemented method for storing data sets in and retrieving data sets from a data storage system in a given number and sorted by a data attribute of the data set, comprising the steps of storing data sets each including one or more attributes in a plurality of binary tree structures, each of said binary tree structures with their nodes representing the entity of one of the data attributes of the data sets in a sorted manner, receiving a query for searching and returning data sets according to query conditions in said given number and sorted by a sort attribute, accessing the binary tree structure of said sort attribute, serially traversing the nodes of said binary tree structure according to the sort attribute, at each node checking whether the data set associated to said node meets the query conditions and, if true, returning said data set, terminating said traversing when said given number of data sets is reached.

The above-mentioned object is further met by a computer program product for storing data sets in and retrieving data sets from a data storage system comprising a plurality of instructions which, when loaded into a memory of the data storage system, cause at least one processor of the data storage system to execute the steps of aforesaid computer implemented method.

The invention makes use of the special storing structure of the data sets in binary tree structures—so-called "attribute trees"—as they are disclosed in both the WO-publications cited above. In such an attribute tree each node represents a data attribute of an according data set. The nodes are arranged in a sorted manner, thus the computer implemented method according to the invention just makes use of this existing sorted tree structure which was generated by an according storing of the data sets in the data storage system in a plurality of binary tree structures. Inasmuch it is only necessary for the method to access the binary tree structure of the according sort attribute and serially traversing the nodes of said binary tree structure. As soon as the given number of required data sets is reached the traversing of the nodes of the binary tree structure can be terminated and the required number of result data sets can be returned to the user.

As can readily be seen it is not necessary to sort the whole result data sets thus saving extraordinarily much computing time.

BRIEF DESCRIPTION OF THE DRAWINGS

FIG. 1 shows an attribute tree 1 consisting of nodes 2 and branches 3 arranged as a so-called binary tree. Each node 2 represents a certain value of the attribute "color", which attribute is a so-called "InfoType" data structure in the data storage system applications of the applicant. The attribute tree 1 is linked to the data structure used in the data storage system by an anchor 4, which is broadly discussed in WO 02/061612 A2, and represents with its nodes 2 the entity of the data attribute "color" of all data sets in a sorted manner.

Figure 3:
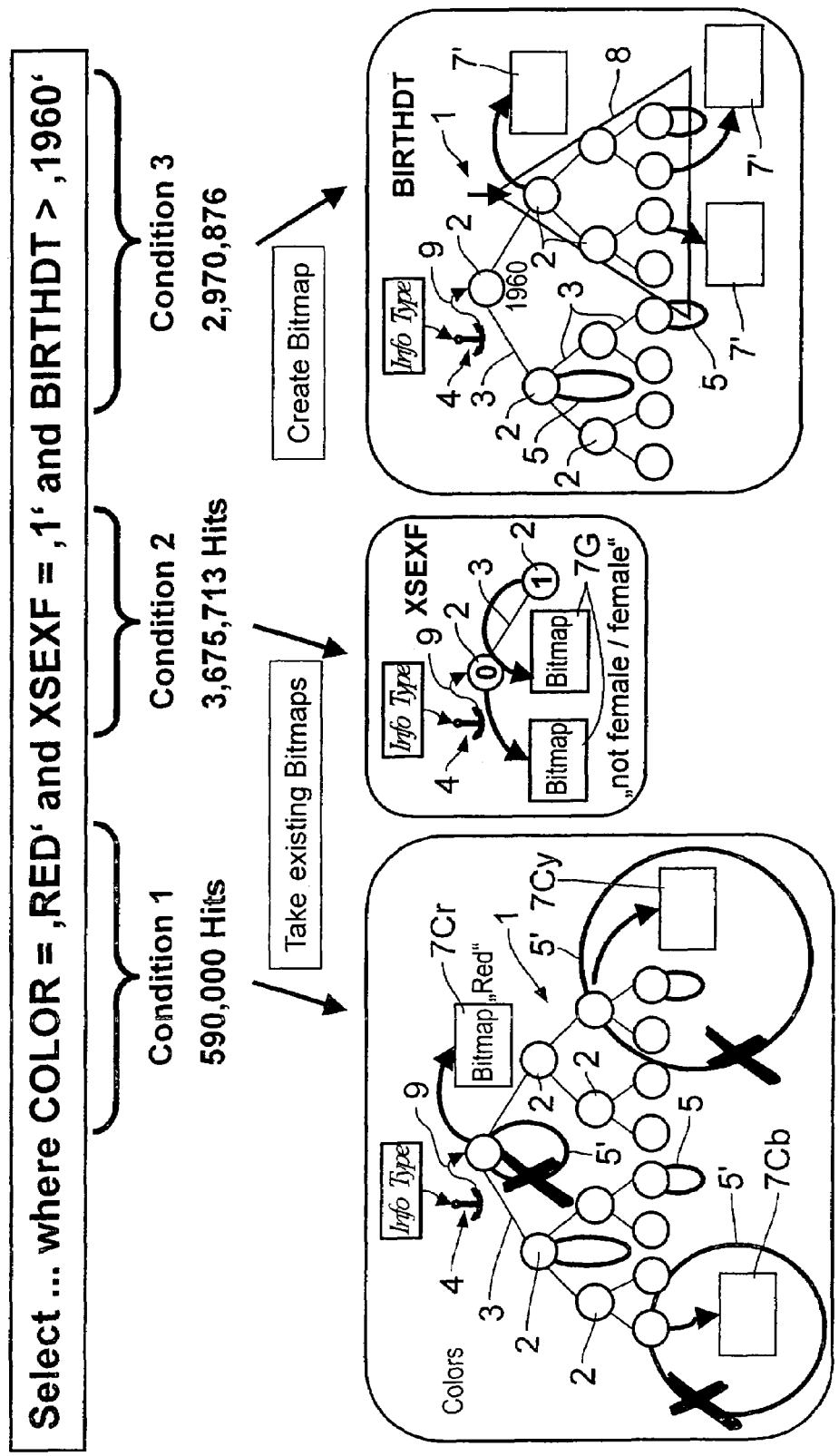
FIG. 3 is a schematic representation of a query with tree conditions reflecting the attribute tree structures of three attributes.

In the computer implemented method according to the invention data sets including several attributes like "color". "gender". "birth date" or the like are stored in the data storage system in a plurality of binary tree structures 1, as they are shown in FIG. 3.

Figure 1:
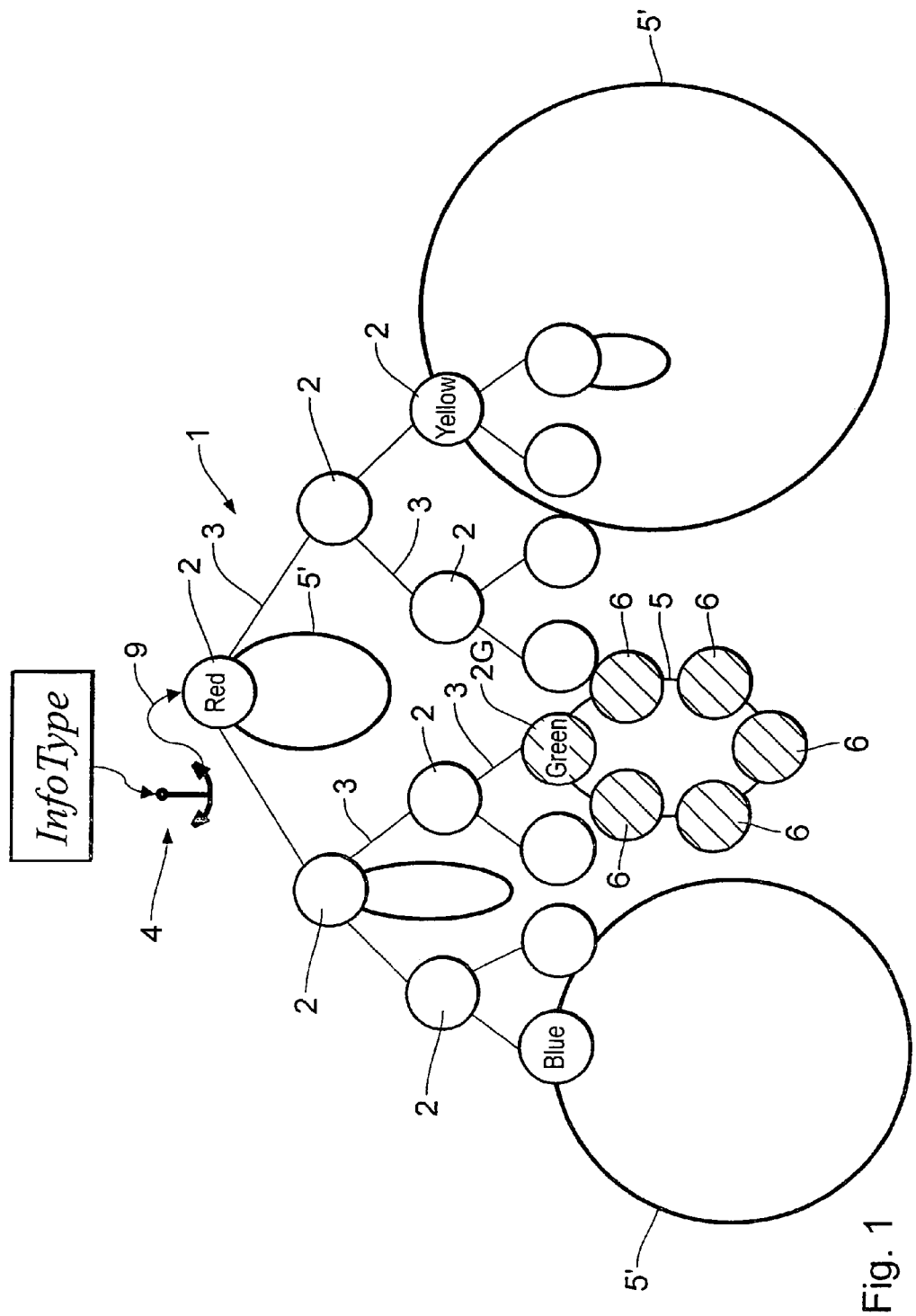
FIG. 1 is a diagram of a tree structure representing a data attribute "color" including so-called rings.

At the nodes 2 representing the color attributes "red", "blue", "green", "yellow" etc. there are attached so-called rings 5 which represent data elements having the same value, like "green" at the node 2G. This master node 2G plus the further five nodes 6 in the ring 5 have the same attribute value "green". Each individual node 2G, 6 of the ring 5 represents exactly one dataset, in which the attribute color with the value "green" appears. The same principle applies for the other color values and in general for any other attribute for which the same value can appear repeatedly. These other rings 5' are represented as circle in FIG. 1. This drawing figure also symbolizes that the rings 5, 5' can have various sizes, i.e. different numbers of nodes.

In this connection attention is to be drawn to the fact that in such tree structures nodes may have no rings, e.g. if the node represents a unique attribute, like a single costumer number in a client administration program. On the other hand there may be attribute trees with a small number of large rings, e.g. data structures which represent flags—such as the gender—, countries and the like. In this case most of the nodes are not found in the tree branches, but in the rings that are attached to the master nodes of the tree.

Figure 2:
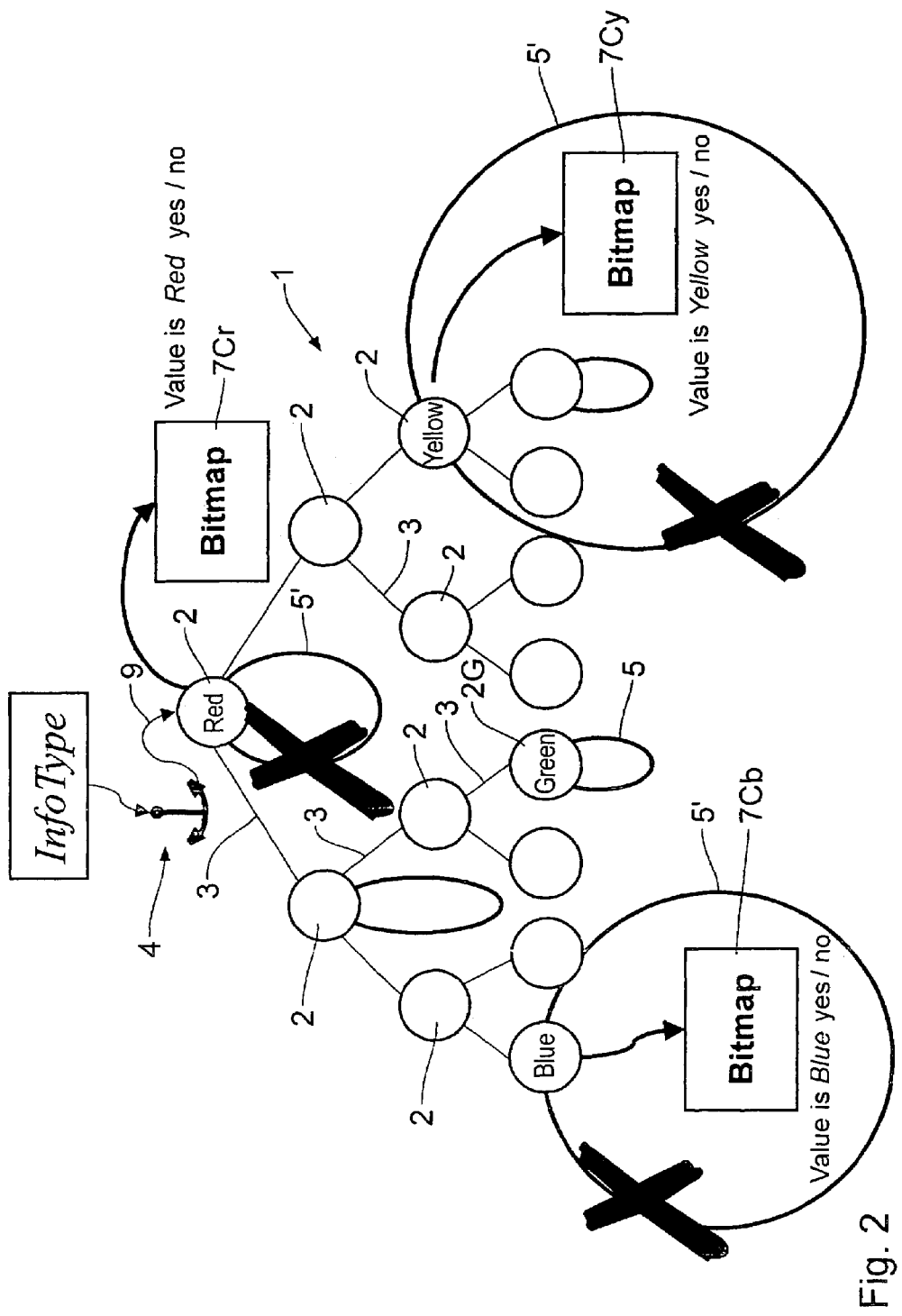
FIG. 2 is a diagram according to FIG. 1 in which some large rings are replaced by bitmaps.

Now the storage and processing of queries is more effective in case when large rings are replaced by bitmaps. This is shown in FIG. 2 in which the large rings 5 attached to the red, blue and yellow master nodes 2 are replaced by bitmaps 7Cr, 7Cb, 7Cy. The ring 5 attached to node 2G "green", however, is not replaced as it only includes six elements and thus is small.

The discrimination between small and large rings is based on runtime measurements for example during startup or also during the runtime of the data storage system and the according computer program. These measurements are intended to determine the number of datasets from which bitmaps for logical combinations are more economical than other query strategies, like the so-called guide mechanism. Reference is made to aforesaid European patent application No. 03 015 365.4.

For few hits, bitmaps are almost empty and thus uneconomical. For a high number of hits, the guide mechanism is uneconomical because too many guide instances must be individually created and combined. The system can determine the break-even point for the number of elements in a ring and replace all rings that contain more than the break-even number of elements by the bitmaps 7Cr, 7Cb, 7Cy (see FIG. 2). As stated above, in each bitmap one bit represents exactly one dataset in the sequence of the dataset anchor. So if five million datasets are loaded in the data storage system, each bitmap consists of five million bits. In a 32-bit-environment this corresponds to 156250 machine words or to 78125 machine words in a 64-bit-environment. This sums up to 610 kilobytes per bitmap.

Now to give an example, in a bitmap 7Cr for the attribute "color" with the value "red" the bitmap reflects, whether the color "red" appears (bit value=1) or not (bit value=0) in a certain dataset.

Now FIG. 3 illustrates the way of how a query containing a plurality of attribute conditions is executed. The example query should select all datasets (for example orders for automobiles) for red-colored automobiles sold to women born later than 1960. Accordingly the example query consists of condition 1 (color="red"), condition 2 (gender is female/XSEXF="1") and condition 3 (birthdate BIRTHDT>"1960").

As explained in the previous applications taken into reference the three attributes color, gender and birthdate are arranged in respective attribute trees with element counters which easily and fast give the number of hits for each individual condition. In the example query the number of hits for condition 1 is 590,000, for condition 2 is 3,675,713 and for condition 3 is 2,970,876. The number of hits concerning all three conditions is high enough to evaluate the query with the help of bitmaps.

In this connection the bitmaps 7Cr, 7G for color="red" on the one hand and XSEXF="1" on the other hand are static bitmaps which are already existing and stored in an according memory of the data storage system.

Now as is shown in FIG. 3, lower part the bitmaps 7Cr, 7G for the first two conditions "color" and "gender" already exist and are used directly. By descending through the corresponding attribute tree the required bitmaps 7Cr, 7G for the color "red" and the gender "female" can be located very quickly. In particular the attribute XSEXF for the gender is only a flag with the two values 0 and 1 inasmuch the attribute tree consists of only two nodes with enormous rings which are now replaced by the bitmaps 7G.

For the third condition a start pointer 9 from anchor 4 is used in the attribute tree 1 for the birthdate BIRTHDT to identify one or more subtrees 8 with valid hits for the condition ">1960". To fulfill this condition all nodes lying to the right of the node with the value "1960" are to be found and associated to bitmaps, or to rings so small that a bitmap is not effective. Finally a node might have no ring, because the relevant value appears only once.

Now to create a bitmap 7B (FIG. 4) for the subtree 8 that contains the nodes which satisfy the condition ">1960", all the bitmaps 7' of the subtree 8 must be logically combined with OR (this occurs machine-word-wise). Furtheron the bits of the small rings and the nodes without rings must be set to 1.

Figure 4:
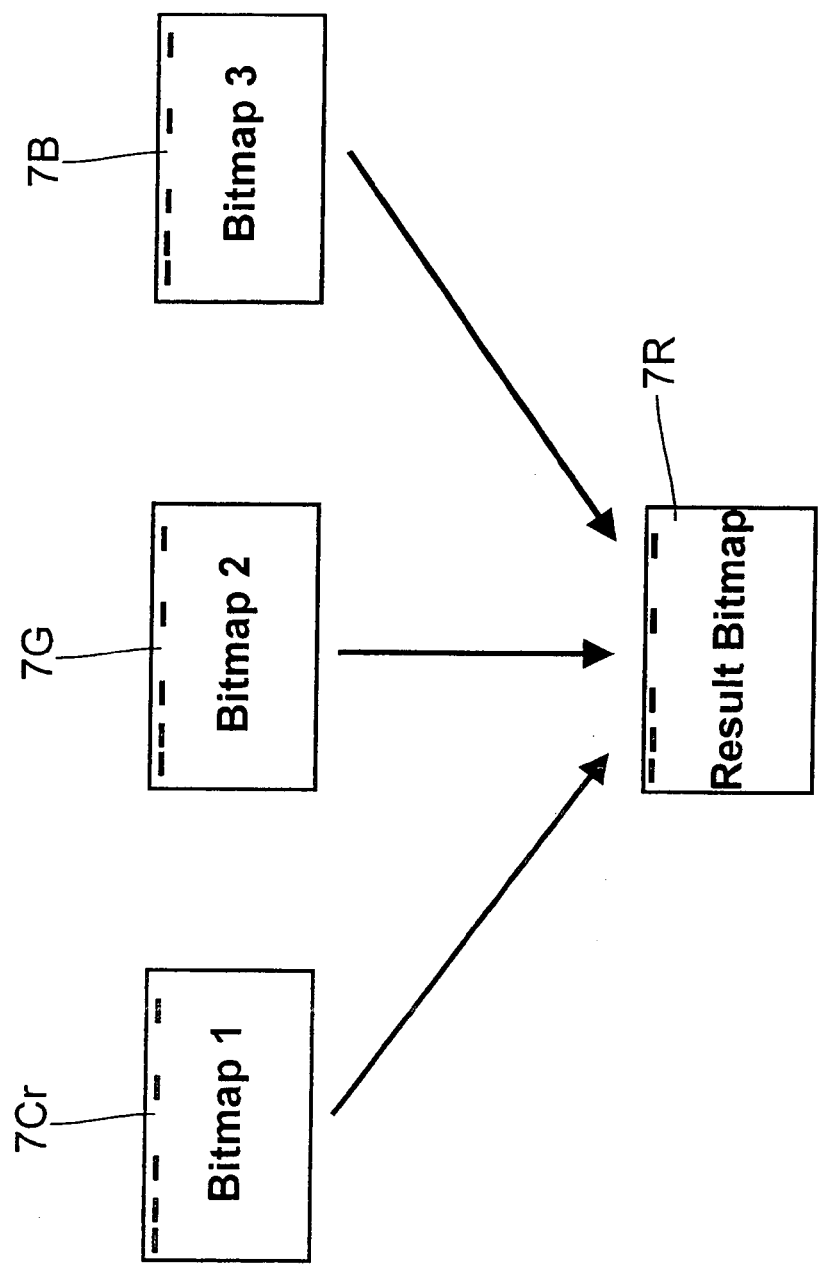
FIG. 4 is a schematic diagram of a query reflecting the creation of a result bitmap.

In this way finally three bitmaps 7Cr, 7G, 7B are reached, one for each condition, as is shown in FIG. 4. These three bitmaps are now combined with the logical operator AND bit by bit in units of machine words, as the CPU can logically combine two machine words in one clock cycle. From this combination of the three bitmaps 7Cr, 7G, 7B for the individual conditions we get a result bitmap 7R, in which all those bits are set to 1 that correspond to datasets that satisfy all three conditions 1, 2 and 3. The dataset or—speaking in the terminology of the applicant—DataCourse satisfying all the conditions is represented by the position in the bitmap and can be retrieved by usual memory mapping.

Now as can readily be realized in connection with the static bitmaps 7Cr, 7G on the one hand and the dynamic bitmap 7B on the other hand there might be the problem that calculating the dynamic bitmap 7B for the condition ">1960" is runtime-consuming and extensive. Now in case the query just alters the condition 1 from color="red" to color="green" the extensive process to determining the dynamic bitmap for the condition ">1960" must be repeated. This is avoided by the invention inasmuch, as the dynamic bitmap 7B is stored in a cache memory (not shown) of the data storage system. Thus the dynamically calculated resulting bitmap 7B for the condition ">1960" is not just "thrown away", but kept for a while to be used in future queries.

This calculated bitmap data structure is preferably linked to an attribute tree representing a data entity of said attribute, like the subtree 8 of the attribute tree 1 in FIG. 3 representing the birthdate>1960. Furtheron the dynamically calculated bitmaps can be placed in a separate tree like search structure, which for example is sorted by a combination of operator and value, e.g. ">1960".

Now turning to the core of the present invention the query illustrated by FIG. 3, namely selecting data sets for red-colored automobiles sold to women born later than 1960, is altered inasmuch as only a given number of e.g. ten data sets should be returned sorted by the data attribute "birthdate" to get only the youngest women (means highest birthdate). To get this data set information the data storage system upon receiving such a query for searching and returning data sets only needs to access the attribute tree 1 representing the data attribute "birthdate BIRTHDT" which contains this attribute of all data sets in an ordered manner (see FIG. 3, right attribute tree, and FIG. 5). "Ordered manner" means that the node 21 most left of the tree represents the lowest level-node, i.e. the lowest birthdate, e.g. Mar. 4, 1946. The most right node 2h represents the highest level node, i.e. the birthdate of the youngest client, e.g. Nov. 12, 1983.

Now in case of aforesaid query the sort attribute birthdate is part of the query. This means that the retrieval routine accesses the subtree 8 for "BIRTHDT>1960" of the attribute tree 1 starting from the highest-level node 2h which represents the data set of the youngest client. According to known traversal algorithms the subtree 8 is traversed visiting each node 2 once. At each node the according data attribute is to be checked whether or not its associated data set meets the query conditions, i.e. is a hit of the query. This check can be done by making the according logical operations representing the query, e.g. checking whether the data set of node 2eg represents a female person who ordered a red car. If available this check can also be realized by accessing the result bitmap 7R and looking up whether the data set, to which the considered node 2eg belongs, is part of the hit list.

In case that the data set represented by node 2eg belongs to the results of the query the data of this data set are copied into a send buffer 10.

With traversing the subtree 8 the retrieval routine finally finds the given number of e.g. 10 data sets which belong to the result of the query, where data sets are stored in the send buffer 10. When said given number of data sets is reached the traversing of the subtree 8 is terminated and the contents of the send buffer 10 is sent to an UI interface 11 and represented to the user.

Figure 5:
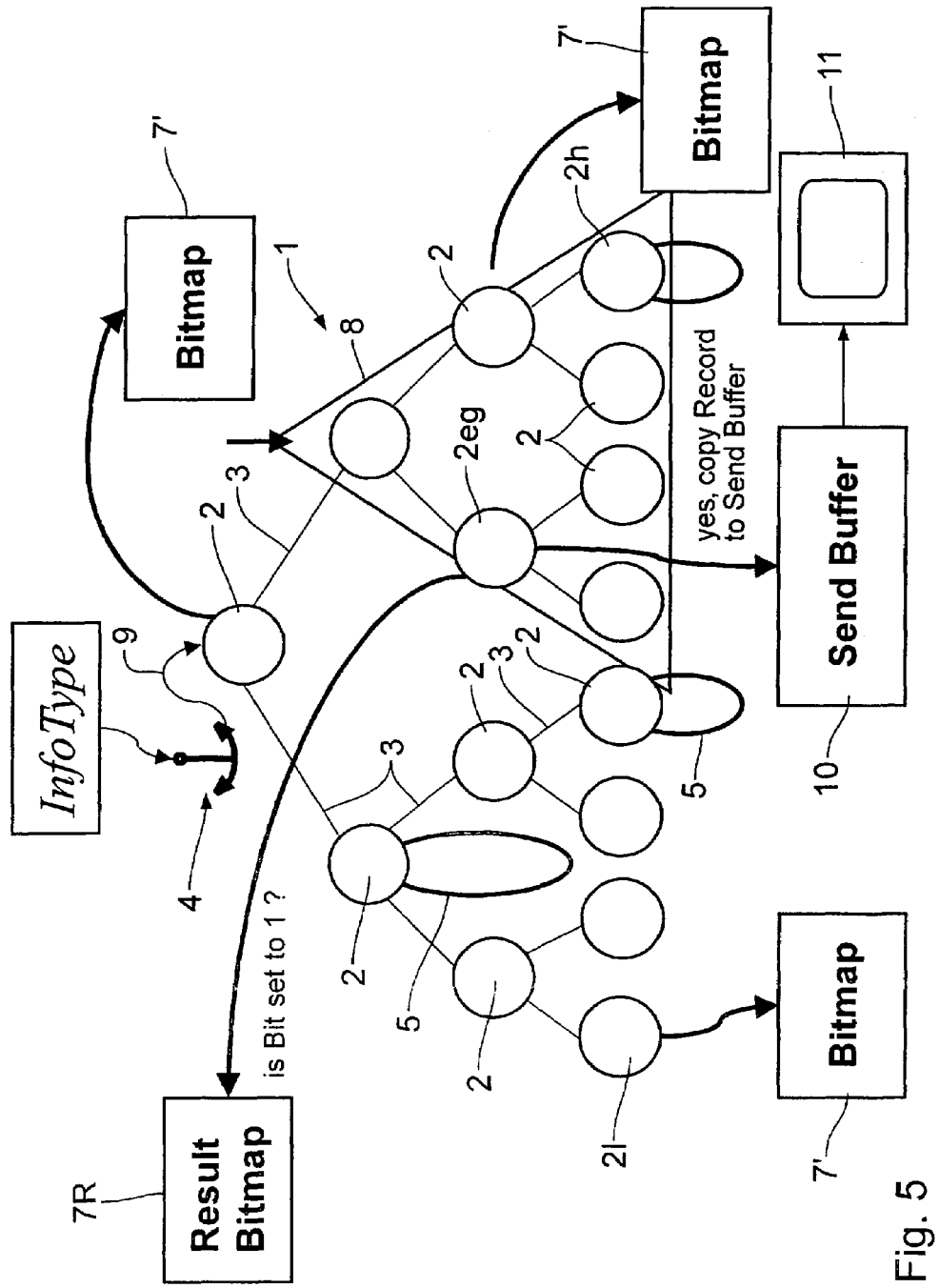
FIG. 5 is a schematic diagram of an attribute tree structure being traversed for a sorted return of result data sets.

In case that e.g. an ascendingly sorted return of data sets is required by the user, i.e. that the data sets sorted by an increasing birthdate (means oldest persons first), the retrieval routine starts at the lowest level node 21 of the birthdate attribute tree 1 of FIG. 5.

In case that the sort attribute is not part of the query conditions e.g. that the results of the above mentioned query are to be returned ascendingly sorted by the postcode of the clients' residence city, then the according attribute tree for the attribute "postcode" (not shown in the drawings) is to be traversed in a manner not restricted to a certain subtree representing part of the query conditions. The retrieval routine, however, runs in the same way as explained above terminating the traversing of the attribute tree when said given number of data sets, e.g. 10, is reached.

The invention claimed is:

1. A computer implemented method to store data sets in and to retrieve data sets from a data storage system in a restricted number of data sets and sorted by a data attribute of the data set, comprising:

storing data sets each including one or more attributes in a plurality of binary tree structures (1), each of said binary tree structures (1) comprising nodes (2) and representing the entity of one of the data attributes of the data sets in a sorted manner, receiving a query to search and to return data sets according to query conditions in said restricted number of data sets and sorted by a sort attribute, accessing the binary tree structure (1) of said sort attribute, serially traversing the nodes (2) of said binary tree structure (1) according to the sort attribute, at each node (2) checking whether the data set associated to said node meets the query conditions and, if this is true, then returning said data set, wherein, in case that the sort attribute is part of the query conditions, only said nodes (2) of the binary tree structure (1) representing the sort attribute are accessed which meet the query condition, and terminating said traversing when said restricted number of data sets is reached.

2. The method according to claim 1, wherein for an ascendingly sorted return of data sets the accessed binary tree structure (1) is traversed beginning from the lowest-level node (21).

3. The method according to claim 1, wherein for a descendingly sorted return of data sets the accessed binary tree structure (1) is traversed beginning from the highest-level node (2h).

4. A computer implemented method to store data sets in and to retrieve data sets from a data storage system in a restricted number of data sets and sorted by a data attribute of the data set, comprising:

storing data sets each including one or more attributes in a plurality of binary tree structures (1), each of said binary tree structures (1) comprising nodes (2) and representing the entity of one of the data attributes of the data sets in a sorted manner, receiving a query to search and to return data sets according to query conditions in said restricted number of data sets and sorted by a sort attribute, accessing the binary tree structure (1) of said sort attribute, serially traversing the nodes (2) of said binary tree structure (1) according to the sort attribute, at each node (2) checking whether the data set associated to said node meets the query conditions and, if this is true, then returning said data set, and terminating said traversing when said restricted number of data sets is reached, wherein, if the sort attribute is not part of the query conditions, then nodes of the binary tree structure representing the sort attribute are accessed and checked as to whether or not data sets associated with the accessed nodes the query conditions.

5. The method according to claim 1, wherein said checking whether the data set associated to a node (2eg) meets the query conditions is realized by executing according logical operations.

6. A computer implemented method store data sets in and to retrieve data sets from a data storage system in a restricted number of data sets and sorted by a data attribute of the data set, comprising:

storing data sets each including one or more attributes in a plurality of binary tree structures (1), each of said binary tree structures (1) comprising nodes (2) and representing the entity of one of the data attributes of the data sets in a sorted manner, receiving a query to search and to return data sets according to query conditions in said restricted number of data sets and sorted by a sort attribute, accessing the binary tree structure (1) of said sort attribute, serially traversing the nodes (2) of said binary tree structure (1) according to the sort attribute, at each node (2) checking whether the data set associated to said node meets the query conditions and, if this is true, then returning said data set, and terminating said traversing when said restricted number of data sets is reached, wherein said checking whether the data set associated to a node (2*eg*) meets the query conditions is realized by accessing an available result bitmap (7R) representing a hit list of a query and looking up whether the associated data set of said node (2*eg*) belongs to the hit list.

7. A computer implemented method to store data sets in and to retrieve data sets from a data storage system in a restricted number of data sets and sorted by a data attribute of the data set, comprising:

storing data sets each including one or more attributes in a plurality of binary tree structures (1), each of said binary tree structures (1) comprising nodes (2) and representing the entity of one of the data attributes of the data sets in a sorted manner, receiving a query search and to return data sets according to query conditions in said restricted number of data sets and sorted by a sort attribute, accessing the binary tree structure (1) of said sort attribute, serially traversing the nodes (2) of said binary tree structure (1) according to the sort attribute, at each node (2) checking whether the data set associated to said node meets the query conditions and, if this is true, then returning said data set and terminating said traversing when said restricted number of data sets is reached, wherein data sets to be returned are intermediately stored in a send buffer storage (10) until being returned in said restricted number of data sets to an interface means (11) of said data storage system.

8. A computer program product to store data sets in and to retrieve data sets from a data storage system in a restricted number of data sets and sorted by a data attribute of the data set, comprising:

a plurality of instructions that when loaded into a memory of the data storage system cause at least one processor of the data storage system to execute the method steps of claim 1.

9. A computer program product to store data sets in and to retrieve data sets from a data storage system in a restricted number of data sets and sorted by a data attribute of the data set, comprising:

a plurality of instructions that when loaded into a memory of the data storage system cause at least one processor of the data storage system to execute the method steps of claim 2.

10. A computer program product to store data sets in and to retrieve data sets from a data storage system in a restricted number of data sets and sorted by a data attribute of the data set, comprising:

a plurality of instructions that when loaded into a memory of the data storage system cause at least one processor of the data storage system to execute the method steps of claim 3.

11. A computer program product to store data sets in and to retrieve data sets from a data storage system in a restricted number of data sets and sorted by a data attribute of the data set, comprising:

a plurality of instructions that when loaded into a memory of the data storage system cause at least one processor of the data storage system to execute the method steps of claim 4.

12. A computer program product to store data sets in and to retrieve data sets from a data storage system in a restricted number of data sets and sorted by a data attribute of the data set, comprising:

a plurality of instructions that when loaded into a memory of the data storage system cause at least one processor of the data storage system to execute the method steps of claim 5.

13. A computer program product to store data sets in and to retrieve data sets from a data storage system in a restricted number of data sets and sorted by a data attribute of the data set, comprising:

a plurality of instructions that when loaded into a memory of the data storage system cause at least one processor of the data storage system to execute the method steps of claim 6.

14. A computer program product to store data sets in and to retrieve data sets from a data storage system in a restricted number of data sets and sorted by a data attribute of the data set, comprising:

a plurality of instructions that when loaded into a memory of the data storage system cause at least one processor of the data storage system to execute the method steps of claim 7.

* * * * *